Dec. 6, 1960    D. F. PRZYBYLSKI    2,963,183
MATERIAL HANDLING MACHINES HAVING BOOM WITH DETACHABLE TOOL
Filed Sept. 25, 1957    3 Sheets-Sheet 1

INVENTOR.
DANIEL F. PRZYBYLSKI
BY
Daniel K. Kilgore
ATTORNEY

Dec. 6, 1960  D. F. PRZYBYLSKI  2,963,183
MATERIAL HANDLING MACHINES HAVING BOOM WITH DETACHABLE TOOL
Filed Sept. 25, 1957  3 Sheets-Sheet 2
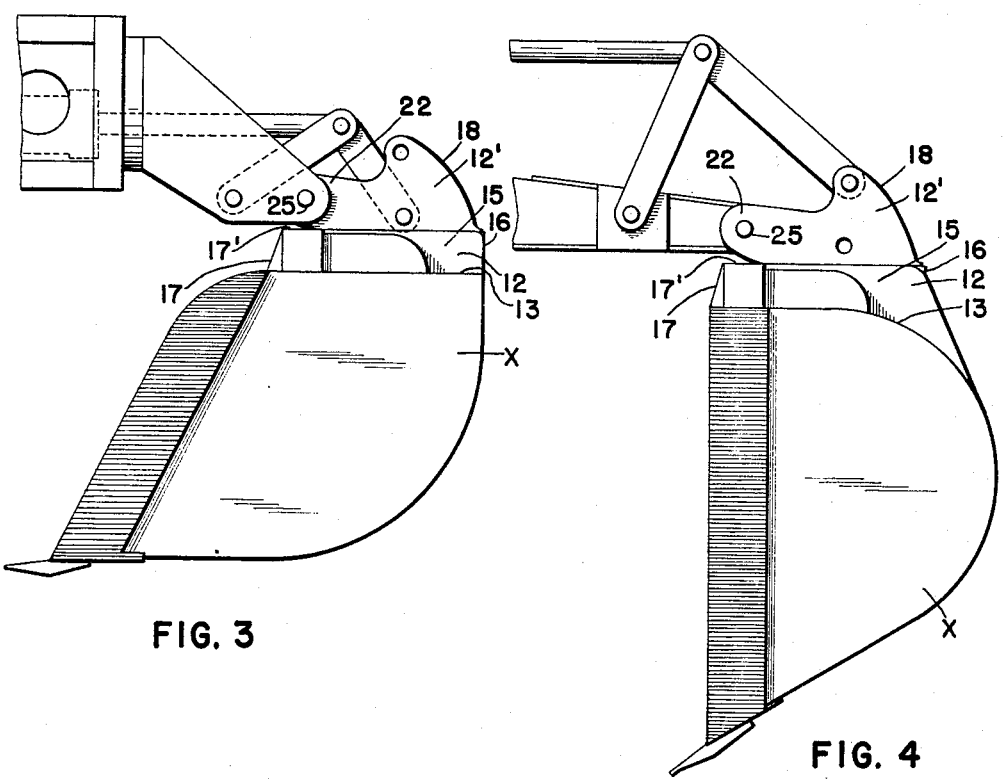
FIG. 3
FIG. 4
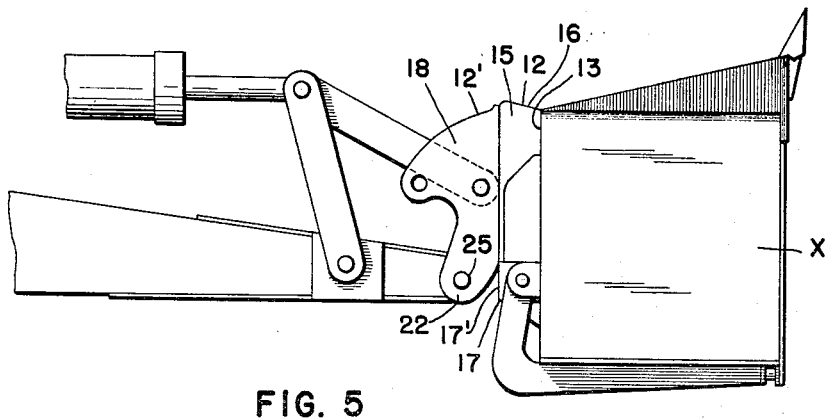
FIG. 5
INVENTOR.
DANIEL F. PRZYBYLSKI
BY
David K. Kilgore
ATTORNEY Dec. 6, 1960   D. F. PRZYBYLSKI   2,963,183
MATERIAL HANDLING MACHINES HAVING BOOM WITH DETACHABLE TOOL
Filed Sept. 25, 1957   3 Sheets-Sheet 3
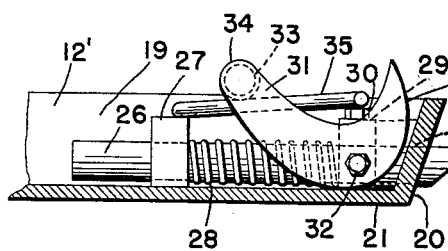
FIG. 6
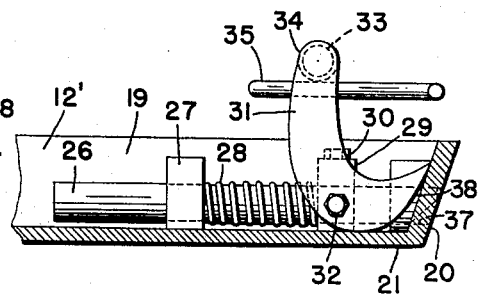
FIG. 7
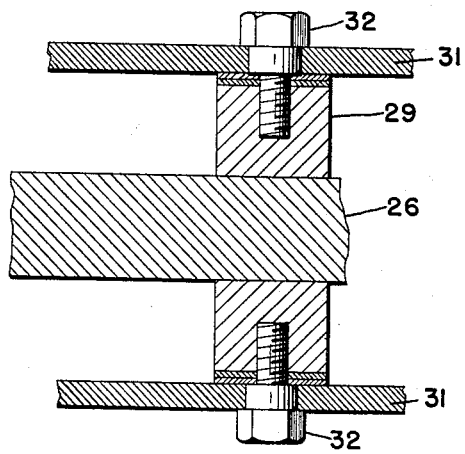
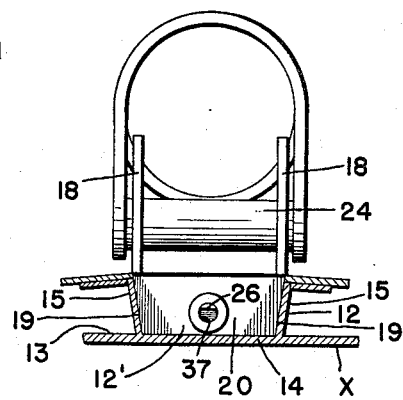
FIG. 9
FIG. 8
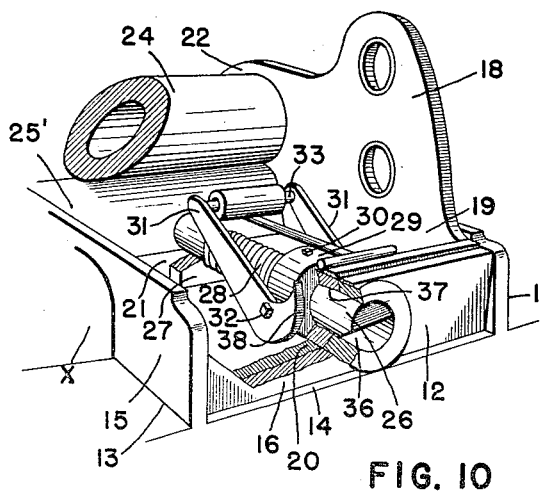
FIG. 10
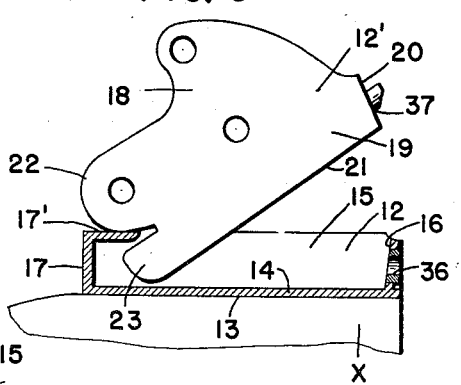
FIG. 11
INVENTOR.
DANIEL F. PRZYBYLSKI
BY
Daniel K. Kilgore
ATTORNEY United States Patent Office 2,963,183
Patented Dec. 6, 1960

2,963,183

MATERIAL HANDLING MACHINES HAVING BOOM WITH DETACHABLE TOOL

Daniel F. Przybylski, Winona, Minn., assignor to The Warner & Swasey Company, Cleveland, Ohio, a corporation of Ohio Filed Sept. 25, 1957, Ser. No. 686,081

6 Claims. (Cl. 214—145)

This invention relates broadly to material handling machines and devices, more particularly to the tools and bucket equipments applicable to the booms and dipper sticks of such equipment, and specifically to an automatic adapter for use in conjunction with material moving tools and buckets permitting the interchange of the same relative to its operating mechanism.

The principal object of this invention is to provide an adapter comprising cooperating elements mounted on the said tools and bucket equipments, and the operating mechanism therefore, respectively, whereby said tools and/or bucket equipment may be interchanged with a minimum amount of manual effort.

Another object of this invention is to provide a tool and bucket adapter for machines and devices of the type described whereby said components may be interchanged without the use of hand tools.

A further object of this invention is to provide a tool and bucket adapter for machines and devices of the type described whereby said components may automatically be attached to the boom or dipper stick of said machines or devices by manipulation of the controls therefore by the operator, in the control cab.

These and other objects of the invention will become apparent from the following specification and claims, taken in conjunction with the accompanying drawings which for a part of this application and in which, like characters indicate like parts, throughout the several views.

Thus, to the above end, generally stated, the invention consists of the novel devices and combination of devices hereinafter described and defined in the claims.

Referring to the drawings:

Figs. 3 and 4 are side elevational views showing a conventional back-hoe mounted by means of the invention directly on a boom, and on a dipper stick assembly respectively;

Fig. 5 is a view similar to Figs. 3 and 4 with the exception that a conventional shovel bucket is shown mounted on a dipper stick assembly also by means of the invention;

Fig. 6 is a side elevational fragmentary view partly in section showing the latch mechanism of the invention in locked position;

Fig. 7 is a view similar to Fig. 6 except that the latch mechanism is shown in its open position;

Fig. 8 is a fragmentary sectional view of certain components of the latch mechanism and means for mounting the same;

Fig. 9 is a front elevational view of the invention showing a fragment of a conventional bucket in section, and the outer end portion of a telescopic boom by means of full lines;

Fig. 10 is a perspective view of the invention with some parts thereof broken away and sectioned to illustrate its latch mechanism; and Fig. 11 is a side elevational view partly in section showing the components of the invention aligned and positioned for snap on engagement, the one with the other.

Figure 1:
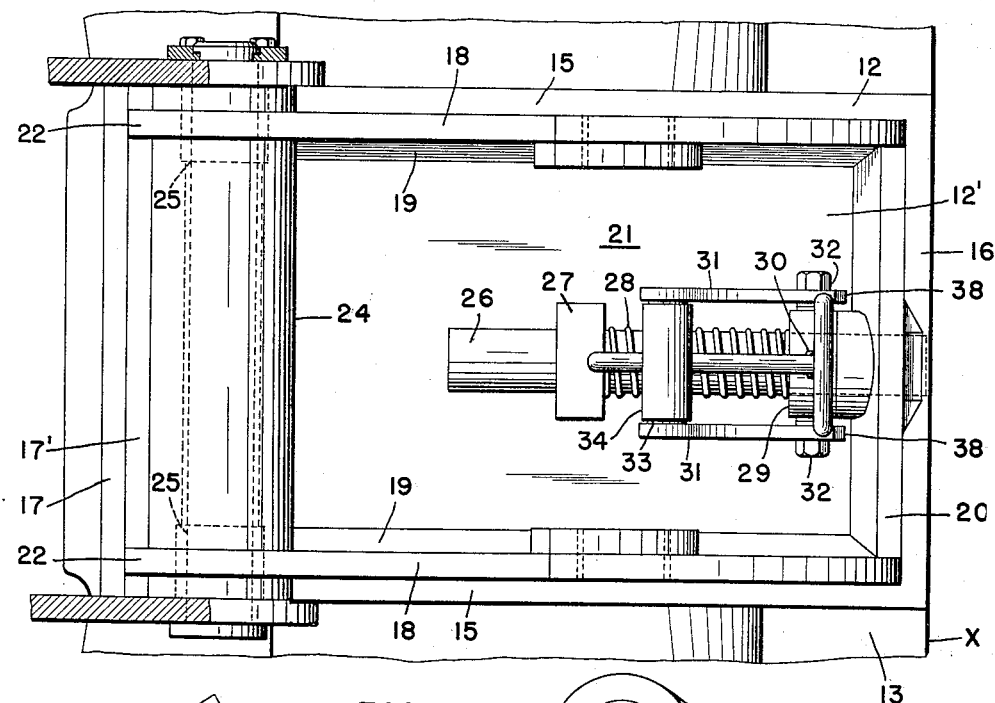
Fig. 1 is a top plan view of the components of the invention mounted on a material handling tool or bucket fragmentarily shown.

It is thought to be desirable for the purpose of this application, in the interest of clarity, that the reference character $x$ be hereinafter directed to illustrate the tools and bucket equipments shown in the drawings fragmentarily and in full.

The numeral 12 indicates as an entirety, a heavy adapter socket that is rigidly mounted, or formed integral therewith, the upper surface 13 of a tool or bucket $x$.

In making reference to said upper surface, it will be understood that the use of the word "upper" is of course relative depending upon the type of tool and its mounted operating position.

Figure 2:
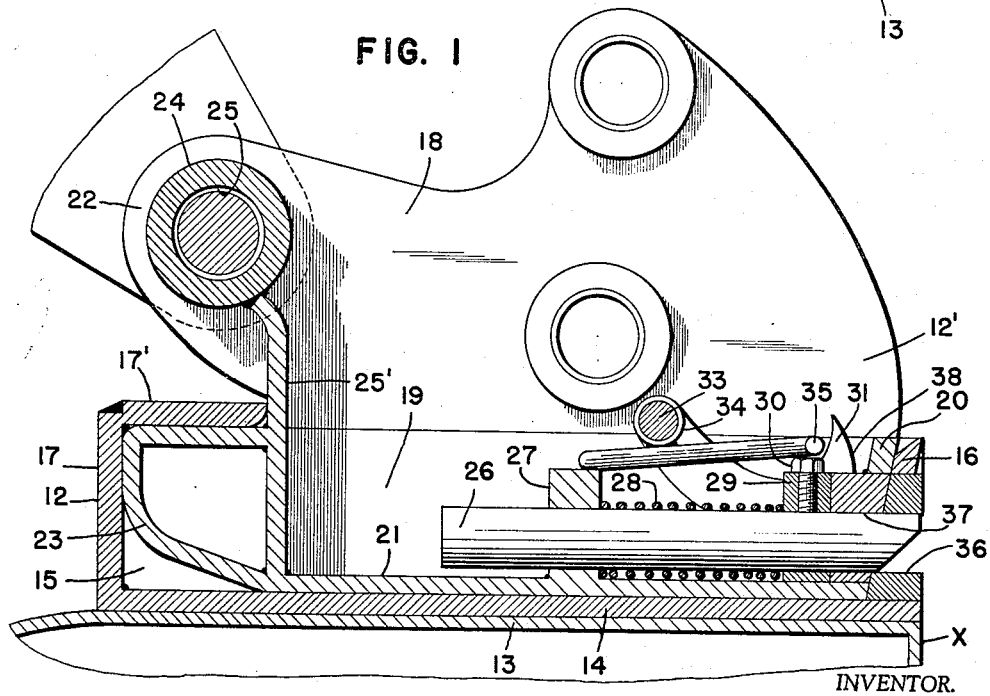
Fig. 2 is a side elevational view of the same, some parts thereof being sectioned.

This adapter socket 12 comprises a rectangularly shaped base plate 14, a pair of opposed upstanding side flanges 15 and an upstanding front flange 16 all of said flanges being downwardly and inwardly inclined relative to the base plate 14, on their inner surfaces, see Figs. 2 and 9, for the purpose of facilitating the alignment and engagement of the adapter socket 12 with its operating component as will be presently explained. The adapter socket 12 is further provided with an upstanding rear flange 17 having a narrow and forwardly projected section 17' that is in a horizontal plane with the upper edge portions of the flanges 15 and 16, and overlies the rear end portion of the base plate 14.

As has been previously indicated herein, it is important to note that the instant invention comprises two co-operating components or elements, to wit: the adapter socket herein identified by the reference numeral 12, and mounted on the material handling tools or buckets, and the tool or bucket adapter element which, as will presently be seen, is pivotally mounted on the boom or dipper stick assembly of a conventional material moving machine or device.

As has been stated, the tool or bucket adapter element of this invention is capable of being mounted directly and in combination with the bucket actuating arms and the tilt cylinder of a hydraulically operated boom, see Fig. 3; or similarly with proper connections, to the dipper stick, the bucket actuating arms and its tilt cylinder, see Fig. 4. Hence, having universal mounting facilities in mind, the tool adapter element of the invention is provided with a plurality of aligned mounting holes in its structure, the position of said holes in commercial adaptations of the invention being dictated by the device or machine to which the invention may be adapted. It is therefore not thought necessary to describe herein, the various connections actuating arms and operating linkage as no inventive concept is thought to be involved.

The tool adapter element 12' comprises a pair of transversely opposed and longitudinally disposed, upstanding mounting bracket plates 18, the lower longitudinal edge portions 19 thereof, being inwardly inclined to coincide with the inclined plane of the inner surfaces of the flanges 15 of the adapter socket 12. The front edge portion 20 of the tool adapter 12' is in the form of a relatively narrow upturned flange, the outer surface of which is also on an inclined plane to coincide with the inclined inner surface of the front flange 16 of the adapter socket 12. It will be readily seen that the co-operating inclined surfaces of the adapter socket 12, and the tool and bucket adapter 12', act as guides to facilitate alignment and ultimate engagement of these respective elements of the invention, and still provide an absolutely tight operating connection therebetween when the same are in locked position.

A base plate 21 connects the side mounting bracket plates 18 and in locked operating position said base plate 21 overlies the base plate 14 of the adapter socket 12 with a close working fit except as will presently be described.

To further facilitate the engagement of the tool and bucket adapter 12' and the adapter socket 12, and to provide a base of resistance against lifting movement for the rear end portion of the connected elements 12 and 12', the rear end portions 21 and 22 of the side mounting brackets 18 and the base plate 21 are upwardly and rearwardly inclined into abutting engagement with the inner surface of the rear flange 17 of the adapter socket 12. Thence these elements are projected rearwardly into tight fitting engagement with the member 17' of the adapter socket 12 to thus form a shoe having a toe portion that engages the transversely disposed cavity formed in the rear end portion of the adapter socket 12.

As shown in Fig. 2, it is important to note that to further facilitate the ease of engagement of the tool and bucket adapter socket 12, the lower edge portion of the member 17' is beveled or rounded as are the rear upper edge portions 22 and 23 of the members 18 and 21 respectively. Obviously, these slight radii formed in the several members as aforesaid, eliminate the possibility of binding of the abutting parts as the elements 12 and 12' of the unit are positioned and aligned to move into locked position.

A tubular spacer bar 24 is rigidly interposed in axial alignment between aligned bores 25 in the upper rear end portion of the side mounting brackets 18 and a vertically disposed transverse flange 25' is rigidly connected by welding to the side mounting brackets 18, the base plate 21, the rear end portion 23 of said base plate, and at its upper edge portion to the tubular spacer bar 24.

A spring loaded latch mechanism is centrally mounted in the tool adapter 12' and comprises a latch bar 26 that is mounted at its rear end portion for endwise longitudinal reciprocal movement in a bore in an upstanding lug 27 formed integral with the base 21. The forward end portion of said latch bar 26 projects with a close working fit through a pair of reinforced aligned bores in the transverse center of the front flange plate 20 of the tool and bucket adapter 12' and the front flange plate 16 of the adapter socket 12. A coiled spring 28 encircles the latch bar 26 between the lug 27 as a base of resistance, and a collar 29 mounted adjacent the forward end portion of the latch bar 26 for adjustable endwise longitudinal movement. A set screw 30 has screw threaded engagement with the collar 29 for the purpose of locking the collar 29 at a predetermined position on the latch bar 26 to adjust the throw of said latch bar as will presently be explained.

A pair of lever acting wiper cams 31 are pivotally mounted to opposite sides of the collar 29 by studs 32 having limited screw threaded engagement with aligned threaded transverse bores in said collar 29. A cross-tie bar 33 rigidly connects the rear end portions of the cams 31 and a sleeve 34 having a rigidly attached forwardly projected hand lever 35 has a working fit for axial rotation on the cross-tie bar 33. The forwardly projected hand lever 35 overlies the assembled latch bar and spring assembly 26 and 28, respectively.

Engagement of the adapter socket 12 and the tool and bucket adapter 12' are controlled by the latch mechanism and said elements have automatic locking engagement when aligned by the machine operator by manipulation of the hydraulic controls in the operator's cab. The forward end portion of the latch bar 26 is rearwardly and downwardly inclined to afford a cam surface cooperating with the inclined surface of the base plate 16 of the adapter socket 12. The transverse center of the upper edge portion of the flange 16 is also machined to afford a smooth working fit with the cam surface of the latch bar 26. Thus, when the operator has aligned the elements 12 and 12' said members are then forced into engagement and when the reinforced bores 36 and 37 in the flange members 16 and 20 respectively are in axial alignment, the spring loaded latch bar 26 automatically is projected through said bores to lock the assembly in operating position.

To disengage the tool adapter 12' from the adapter socket 12 it is only necessary to withdraw the latch bar 26 from engagement with the bore 36 in the flange member 16. This is readily and positively accomplished by manually exerting a forward pull on the hand lever 35 when the entire assembly is resting on the ground. This forward pressure exerted on the hand lever 35 imparts movement to the rocker surfaces 38 of the lever acting wiper cams 31 wherein said surfaces acting upon the inner inclined surface of the flange member 20 against tension of the spring 28, withdraws the latch bar 26 from engagement with the bore 36 in flange member 16, see Figs. 6 and 7 for an illustration of this sequence. As cam surfaces 38 pass over dead center the entire assembly will be and be held in this open position until manually released by reversing the action and movements manually exerted on the latch mechanism just described.

While there are herein disclosed but a limited number of embodiments of the structure, process and product of the invention herein presented, it is possible to produce still other embodiments without departing from the inventive concept herein disclosed, and it is desired, therefore, that only such limitations be imposed on the appended claims as are stated herein, or required by the prior art.

What I claim is:

1. In an apparatus of the character described, connecting means for releasably connecting a tool to the free end of a boom, said connecting means comprising first and second elements mounted on said boom and tool respectively, said first element being adapted to be pivotally mounted on said boom and to be pivoted relative to said boom by a power cylinder carried by said boom, one of said elements having structure defining a socket extending outwardly of a first side of the element and along a line spaced from one edge of said first side and opening toward said one edge, the other of said elements having a mating outer side adapted to fit against said first side of said one element between said edge and socket and a portion along one edge of said outer side adapted to be received by said socket and to fit tightly therein when said sides are mated, said portion and said socket being engageable by moving said portion along said first side toward said socket, said one element further comprising a first part extending outwardly of the plane of said first side thereof and overlapping the end of said other element adjacent said one edge of said one element when said elements are in assembled relationship and spaced members projecting outwardly from said first side and disposed to receive therebetween the sides of said other element extending between the portion thereof received in said socket and said end of said other element and holding said elements when mated against relative movement parallel to said one edge of said one element, and releasable latching means comprising interfitting latching parts on respective ones of said elements engageable upon the relative movement of said elements to engage said portion in said socket and to fit the mating sides of said elements against each other.

2. In an apparatus of the character described, the structure as defined in claim 1 wherein said latching means comprises a spring-biased latch member mounted on said other element adjacent the said end thereof and adapted to be received in an opening in said first part.

3. In an apparatus of the character described, the structure as defined in claim 1 wherein said spaced members have facing sides which are inclined downwardly and inwardly toward each other from the outer edges of said spaced members and said first part has a side facing said socket which is inclined downwardly and inwardly toward said socket and said other element is provided with peripheral edges which are inclined and adapted to mate against the said sides of said spaced members and said first part.

4. In an apparatus of the character described, the structure as defined in claim 3 wherein said latching means comprises a spring-biased latch member mounted on said other element adjacent the said end thereof and adapted to be received in an opening in said first part.

5. In an apparatus of the character described, the structure as defined in claim 1 wherein said portion has an outer surface defining a continuation of said outer side but inclined inwardly of said other element from the plane of said mating outer side whereby said outer surface extends diagonally across said socket when said elements are mated.

6. In an apparatus of the character described, the structure as defined in claim 5 wherein said spaced members have facing sides which are inclined downwardly and inwardly toward each other from the outer edges of said spaced members and said first part has a side facing said socket which is inclined downwardly and inwardly toward said socket and said other element is provided with peripheral edges which are inclined and adapted to mate against the said sides of said spaced members and said first part.

References Cited in the file of this patent

UNITED STATES PATENTS

| | | |
|---|---|---|
| 357,084 | Hollenbeck | Feb. 1, 1887 |
| 2,259,456 | Crawford | Oct. 21, 1941 |
| 2,281,928 | Fletcher | May 5, 1942 |
| 2,447,150 | Anderson | Aug. 17, 1948 |
| 2,935,802 | Wolfe | May 10, 1960 |